United States Patent
Harrington et al.

(10) Patent No.: US 12,041,314 B2
(45) Date of Patent: Jul. 16, 2024

(54) SATELLITE COMMUNICATION SYSTEM AND SATELLITE COMMUNICATION METHOD

(71) Applicant: Hughes Network Systems, LLC, Germantown, MD (US)

(72) Inventors: Emanuel Harrington, Bowie, MD (US); Frank Li, Herndon, VA (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 201 days.

(21) Appl. No.: 16/715,529

(22) Filed: Dec. 16, 2019

(65) Prior Publication Data

US 2021/0185406 A1 Jun. 17, 2021

(51) Int. Cl.
*H04N 21/61* (2011.01)
*H04N 21/234* (2011.01)
*H04N 21/4363* (2011.01)
*H04N 21/44* (2011.01)

(52) U.S. Cl.
CPC ....... *H04N 21/6143* (2013.01); *H04N 21/234* (2013.01); *H04N 21/4363* (2013.01); *H04N 21/44* (2013.01); *H04N 21/6193* (2013.01)

(58) Field of Classification Search
CPC ........... H04N 21/6143; H04N 21/6193; H04N 21/4363; H04N 21/234; H04N 21/44; H04N 21/4325; H04N 21/4331; H04H 20/74

See application file for complete search history.

(56) References Cited

U.S. PATENT DOCUMENTS

| | | | | |
|---|---|---|---|---|
| 4,390,904 A | * | 6/1983 | Johnston | H04N 17/06 386/249 |
| 6,879,808 B1 | * | 4/2005 | Nations | H04B 7/18586 455/12.1 |
| 8,432,808 B1 | * | 4/2013 | Dankberg | H04B 7/18584 370/235 |
| 9,407,355 B1 | * | 8/2016 | Lerner | H04L 49/9057 |
| 2002/0009283 A1 | * | 1/2002 | Ichioka | G11B 27/036 386/346 |
| 2002/0194607 A1 | * | 12/2002 | Connelly | H04H 60/06 348/E7.071 |

(Continued)

*Primary Examiner* — Robert J Hance
(74) *Attorney, Agent, or Firm* — GLOBAL IP COUNSELORS, LLP

(57) ABSTRACT

A satellite communication system includes a satellite gateway and a plurality of satellite communication terminals. The satellite gateway includes a satellite communication module that is configured to transmit video content data automatically based on a predetermined condition via a satellite communication network. The satellite communication terminals are disposed at a plurality of remote locations, respectively. The satellite communication terminals each includes a satellite communication module that is configured to receive the video content data from the satellite gateway via the satellite communication network, a memory that is configured to pre-store the video content data prior to a first video content request of the video content data via a local communication network, and a local communication module that is configured to provide the video content data from the memory in response to the first video content request of the video content data via the local communication network.

20 Claims, 5 Drawing Sheets

(56) References Cited

U.S. PATENT DOCUMENTS

| | | | |
|---|---|---|---|
| 2005/0289597 A1* | 12/2005 | Kawahara | G11B 27/329 725/52 |
| 2007/0136751 A1* | 6/2007 | Garbow | H04N 21/4755 348/E7.069 |
| 2009/0060468 A1* | 3/2009 | Carlberg | H04N 21/25883 386/297 |
| 2016/0057460 A1* | 2/2016 | Hao | H04N 21/6125 725/78 |
| 2016/0094891 A1* | 3/2016 | Hall | H04N 21/64315 725/63 |
| 2017/0195450 A1* | 7/2017 | Su | H04N 21/4331 |
| 2018/0242048 A1* | 8/2018 | Yang | H04N 21/23655 |
| 2020/0351319 A1* | 11/2020 | Hardy | H04N 21/4622 |

* cited by examiner

SATELLITE COMMUNICATION SYSTEM AND SATELLITE COMMUNICATION METHOD

BACKGROUND

Field of the Invention

The present invention generally relates to a satellite communication system. More specifically, the present invention relates to a satellite communication system for providing video content data. The present invention also relates to a satellite communication method.

Background Information

Recently, smart TVs have become popular in the market. Generally, smart TVs can play internet-based streaming videos, including 4K TV (ultra HD) streaming videos, using smart TV software applications ("apps"). On the other hand, smart TVs also need dedicated or third-party streaming video receivers to use some streaming video applications. The dedicated streaming video receiver is externally plugged into a smart TV to receive the streaming video content, and is linked to a broadband internet device to provide the streaming video content to the smart TV.

SUMMARY

Currently, there is no satellite-based internet service that can support 4K TV due to the video download speed limit of the satellite communication network. Specifically, when smart TVs display real time video streams via the satellite communication network, normal internet access speed can be reduced due to the satellite bandwidth required for the video streams. In addition, even more satellite bandwidth is needed when there are repeat video accesses from many users. In this case, a satellite gateway needs to repeatedly send a large volume of video streams to individual users via the satellite communication network, which requires a significant satellite data transmission and slows down normal internet data transfer speed due to the traffic load.

Furthermore, when a user wants to use a streaming video application that requires a dedicated streaming video receiver, the user needs to prepare a dedicated streaming video receiver independently associated with each smart TV. Specifically, if a user wants to enjoy video contents on a plurality of smart TVs using the streaming video application, then the user need to purchase a plurality of dedicated streaming video receivers—generally as many as the number of smart TVs.

In view of the state of the known technology, one aspect of the present disclosure is to provide a satellite communication system that includes a satellite gateway and a plurality of satellite communication terminals. The satellite gateway includes a satellite communication module that is configured to transmit video content data automatically based on a predetermined condition via a satellite communication network. The satellite communication terminals are disposed at a plurality of remote locations, respectively. The satellite communication terminals each includes a satellite communication module that is configured to receive the video content data from the satellite gateway via the satellite communication network, a memory that is configured to pre-store the video content data prior to a first video content request of the video content data via a local communication network, and a local communication module that is configured to provide the video content data from the memory in response to the first video content request of the video content data via the local communication network.

Another aspect of the present disclosure is to provide a satellite communication method that includes receiving video content data transmitted automatically based on a predetermined condition via a satellite communication network by a satellite communication terminal disposed at a remote location, pre-storing the video content data in a memory of the satellite communication terminal prior to a first video content request of the video content data via a local communication network, and providing the video content data from the memory in response to the first video content request of the video content data via the local communication network.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring to FIGS. 1 to 6, a satellite communication system 10 according to one embodiment will be discussed in detail. With this satellite communication system 10, a user can select and download desired video content through a satellite communication network, and pre-store the desired video content at a satellite-based internet terminal (e.g., a communication terminal 24) at a user location. The user can also enjoy streaming the pre-stored video contents with high resolutions, such as 4K resolution, using stream video applications installed on a plurality of smart TVs (e.g., a plurality of smart TVs 40) at the user location.

Figure 1:
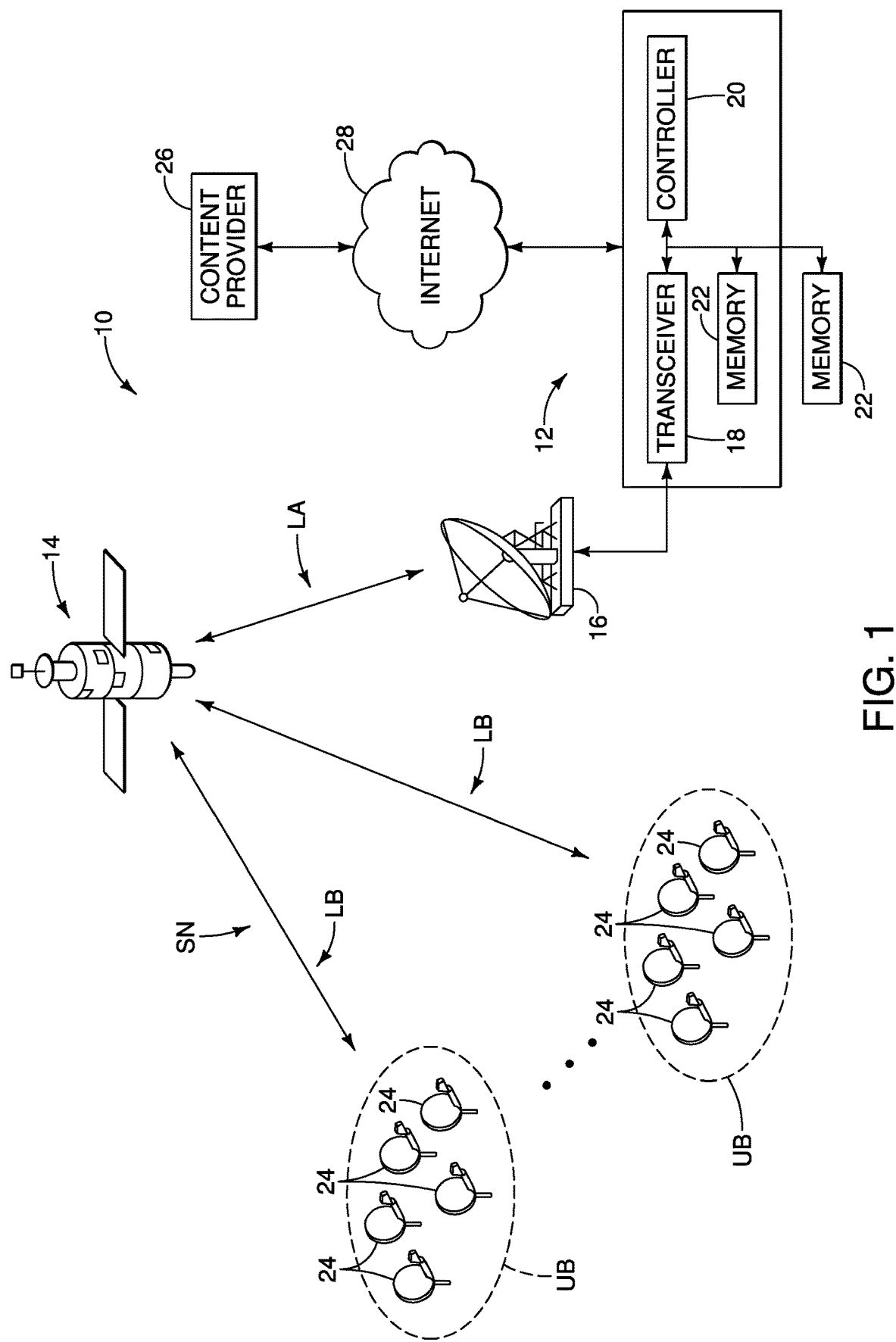
FIG. 1 illustrates an example of a satellite communication system according to one embodiment, illustrating a satellite gateway and satellite communication terminals linked via a satellite communication network.

Specifically, FIG. 1 illustrates an example of the satellite communication system 10 according to an exemplary embodiment. As shown in FIG. 1, the satellite communication system 10 includes a terrestrially mounted gateway 12 (e.g., a satellite gateway), a radio frequency terminal (RFT) 16 and a plurality of communication terminals 24 (e.g., a plurality of satellite communication terminals). The satellite communication system 10 forms a satellite communication network SN in which the gateway 12 and the communication terminals 24 communicate with each other through an orbiting satellite 14.

As shown in FIG. 1, the gateway 12 includes a transceiver 18 (e.g., a satellite communication module), an electronic controller 20, a memory 22, and other types of equipment (not shown) such as amplifiers and so on as understood in the art on which enable communication between the gateway 12 and the communication terminals 24 via the satellite 14. The memory 22 can be, for example, an internal memory in the gateway 12, or other type of memory devices such as flash memory or hard drives with external high-speed interface such as a USB bus or an SATA bus, or remote memories such as cloud storage and so on. These other types of memory can be present at the gateway 12 or accessible at a location apart from the gateway 12 via a network connection such as an Ethernet connection, a Wi-Fi connection or any other suitable type of connection as understood in the art.

As understood in the art, the controller 20 preferably includes a microcomputer with a control program that controls the gateway 12 as discussed herein. The controller 20 can also include other conventional components such as an input interface circuit, an output interface circuit, and storage devices such as a ROM (Read Only Memory) device and a RAM (Random Access Memory) device. The RAM and ROM store processing results and control programs that are run by the controller 20. The controller 20 is operatively coupled to the components of the gateway 12 as appropriate, in a conventional manner. It will be apparent to those skilled in the art from this disclosure that the precise structure and algorithms for the controller 20 can be any combination of hardware and software that will carry out the functions of the present invention.

In the illustrated embodiment, the gateway 12 is connected to the RFT 16. The RFT 16 includes an antenna dish that are mounted on an antenna frame and interconnected to a feed-horn. The feed-horn includes low noise amplifiers and down-converters for amplification and down conversion of the received signal, respectively. The feed-horn directs the transmitted power towards an antenna dish or collects the received power from the antenna dish.

In the illustrated embodiment, the RFT 16 is located at an RF site that is collocated with the gateway 12. Specifically, the RFT 16 is collocated with the gateway 12, and is connected to the gateway 12 through an optical fiber cable or any other suitable type of link as understood in the art.

The gateway 12, the satellite 14 and the communication terminals 24 typically communicate with each other over a radio frequency link, such as a Ku-band link, a Ka-band link or any other suitable type of link as understood in the art, which can generally be referred to as a space link. Specifically, in the illustrated embodiment, the RFT 16 can establish a first space link LA between the satellite 14 and the RFT 16, while the communication terminals 24 can each establish a second space link LB between the satellite 14 and the communication terminal 24. With this configuration, the satellite communication network SN formed by the first space link LA and the second space links LB is established between the gateway 12 and the communication terminals 24 through the satellite 14.

In the illustrated embodiment, as shown in FIG. 1, the gateway 12 can be configured as a network management center or network operating center which, among other things, operates to communicate with remote sites, such as web content providers 26, via the Internet 28, cloud storage, or other terrestrial data networks as understood in the art. With this configuration, the satellite communication system 10 can provide access to the Internet 28 to the users of the communication terminals 24.

The satellite 14 can be any suitable communications satellite for connecting the gateway 12 to the communication terminals 24. The satellite 14 can use small spot beams to optimize capacity and availability for user terminal and gateway access, with uplink and downlink frequencies reused between spot beams in a pattern to maximize capacity and coverage while minimizing cofrequency interference. The satellite 14 provides a gateway coverage by a gateway spot beam. Also, the satellite 14 provides user terminal coverage by a plurality of user spot beams UB. In the illustrated embodiment, the communication terminals 24 are grouped into a plurality of terminal populations that are covered by the user spot beams UB, respectively.

In the illustrated embodiment, the communication terminals 24 are each configured as a VSAT. The communication terminals 24 are disposed at remote locations relative to the gateway 12, respectively. The communication terminals 24 are each typically installed within a house, building or other facility or area.

Figure 2:
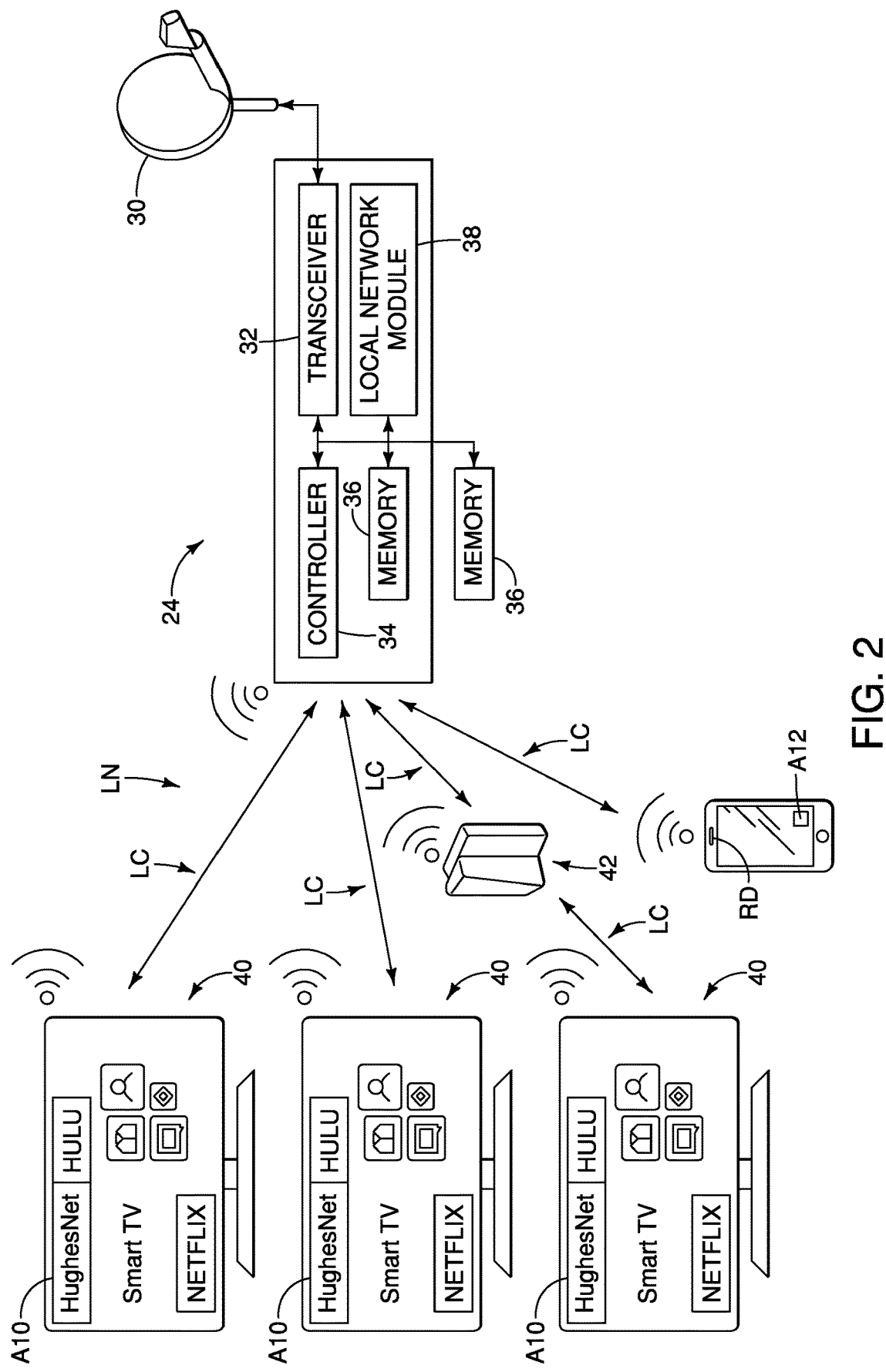
FIG. 2 illustrates further details of the satellite communication system shown in FIG. 1, illustrating the satellite communication terminal and a plurality of smart TVs linked via a local communication network.

Referring now to FIG. 2, the communication terminals 24 each typically include an antenna dish 30, a transceiver 32 (e.g., a satellite communication module), an electronic controller 34, a memory 36, a local network module 38 (e.g., a local communication module), and other types of equipment (not shown) such as amplifiers, waveguides and so on as understood in the art on which enable communication between the communication terminal 24 and the gateway 12 via the satellite 14. The transceiver 32 can include, for example, an integrated satellite modem and any other suitable equipment which enables the transceiver 32 to communicate with the satellite 14 as understood in the art.

The controller 34 preferably an electronic controller that includes a microcomputer with a control program that controls the communication terminal 24 as discussed herein. The controller 34 can also include other conventional components such as an input interface circuit, an output interface circuit, and storage devices such as a ROM (Read Only Memory) device and a RAM (Random Access Memory) device. The RAM and ROM store processing results and control programs that are run by the controller 34. The controller 34 is operatively coupled to the components of the communication terminal 24 as appropriate, in a conventional manner. It will be apparent to those skilled in the art from this disclosure that the precise structure and algorithms for the controller 34 can be any combination of hardware and software that will carry out the functions of the present invention.

The memory 36 can be, for example, an internal memory in the communication terminal 24, or other type of memory devices such as a flash memory or hard drives with external high speed interface such as a USB bus or an SATA bus, or remote memories such as cloud storage and so on. These other types of memory can be present at the communication terminal 24 or accessible at a location apart from the communication terminal 24 via a network connection such as an Ethernet connection, a Wi-Fi connection or any other suitable type of connection as understood in the art.

The local network module 38 includes a wireless and/or wired network interface controller that connects the communication terminal 24 to external communication devices that are typically disposed within the same house, building or other facility or area as the communication terminal 24. That is, the communication terminal 24 can connect to the external communication devices via a wireless signal or directly by a wire. In the illustrated embodiment, as illustrated in FIG. 2, such external communication devices include, for example, a plurality of (three in FIG. 2) smart TVs (e.g., display devices). In the illustrated embodiment, the smart TVs 40 are disposed at different locations or rooms, such as a family room, a bedroom, a basement, and the like, within the same house, building or other facility or area as the communication terminal 24. Thus, in the illustrated embodiment, the plurality of smart TVs 40 are provided for each of the communication terminals 24. In the illustrated embodiment, the communication terminal 24 can wirelessly communicate with the smart TVs 40 directly or via a mesh node or access point 42.

Specifically, in the illustrated embodiment, the communication terminal 24 can establish local communication links LC between the communication terminal 24 and the smart TVs 40 directly or via the mesh node 42 to independently communicate with the smart TVs 40. When the communication terminal 24 is connected to the smart TVs 40 wirelessly, the local communication links LC can be established using Wi-Fi or any other suitable wireless communications. When using Wi-Fi, the local network module 38 can operate using the 802.11 standard using several distinct radio frequency ranges for use in Wi-Fi communications. Of course, alternatively or additionally, the communication terminal 24 can be connected to the smart TVs 40 with a wire. In this case, the local communication links LC can be established using Ethernet or any other suitable wired communications. With this configuration, in the illustrated embodiment, a local communication network LN formed by the local communication links LC is established between the communication terminal 24 and the smart TVs 40.

In the illustrated embodiment, the communication terminal 24 can further be connected to a user device or terminal RD, such as a smart phone, a tablet, a desktop or laptop computer, as understood in the art, wirelessly or by wire. In the illustrated embodiment, the user device RD, such as a smart phone, can be in wireless communication with the communication terminal 24. In this case, the user device RD can also establish the local communication link LC between the communication terminal 24 and the user device RD directly or via a mesh node.

In the illustrated embodiment, the smart TVs 40 are each a network connectable television set with interactive features which allow users to stream video contents, browse the Internet and so forth. Specifically, in the smart TVs 40, a software application A10 ("HughesNet application") is preloaded in advance or installed on demand via an app store or marketplace. Specifically, in the illustrated embodiment, the application A10 of the smart TVs 40 includes a stream video application that allows users to find and stream video content (e.g., video content data) that is provided from the content provider 26 through the Internet 28, the satellite communication network SN and the local communication network LN in a manner similar to the software applications dedicated to video on demand services, such as Hulu, Netflix, Amazon Prime Video, and the like. Furthermore, in the illustrated embodiment, the application A10 of the smart TVs 40 also allows users to find and stream video content that is pre-stored in the memory 36 of the communication terminal 24 and provided from the communication terminal 24 through the local communication network LN, as discussed later.

Figure 3:
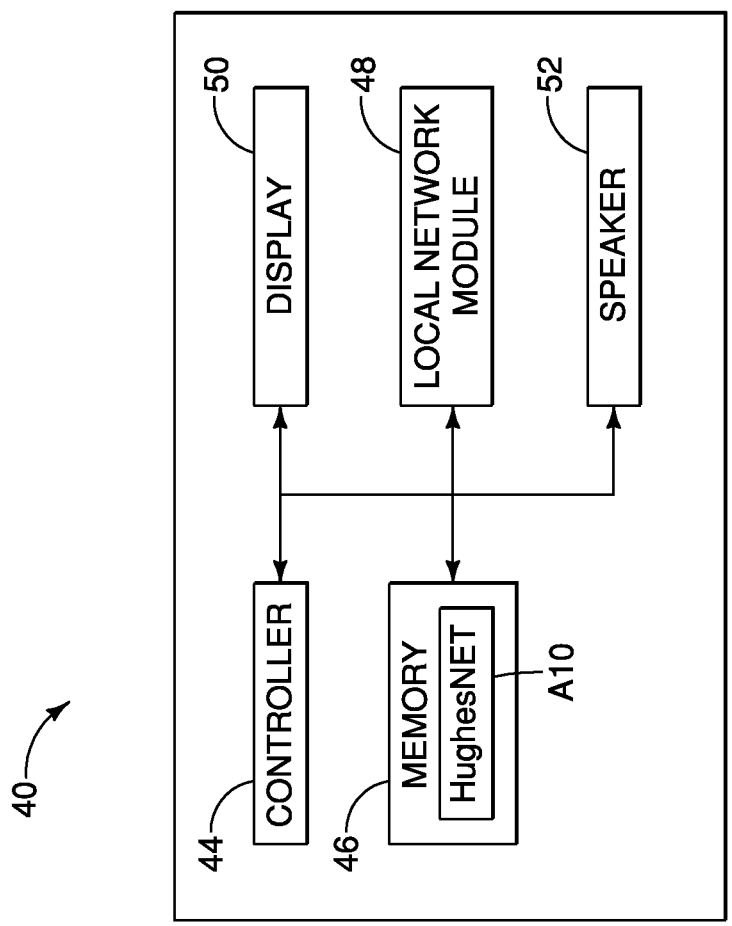
FIG. 3 illustrates further details of the satellite communication system, illustrating detailed configurations of the smart TVs shown in FIG. 2.

Referring now to FIG. 3, the smart TVs 40 each typically include an electronic controller 44, a memory 46, a local network module 48 (e.g., a local communication module), a display or display panel 50, a speaker 52, and so on.

The controller 44 preferably includes a microcomputer with a control program that controls the smart TV 40 as discussed herein. The controller 44 can also include other conventional components such as an input interface circuit, an output interface circuit, and storage devices such as a ROM (Read Only Memory) device and a RAM (Random Access Memory) device. The RAM and ROM store processing results and control programs that are run by the controller 44. The controller 44 is operatively coupled to the components of the smart TV 40 as appropriate, in a conventional manner. It will be apparent to those skilled in the art from this disclosure that the precise structure and algorithms for the controller 44 can be any combination of hardware and software that will carry out the functions of the present invention.

The memory 46 can be, for example, an internal memory in the smart TV 40, or other type of memory devices such as a flash memory or hard drives with external high speed interface such as a USB bus or an SATA bus, or remote memories such as cloud storage and so on. These other types of memory can be present at the smart TV 40 or accessible at a location apart from the smart TV 40 via a network connection such as an Ethernet connection, a Wi-Fi connection or any other suitable type of connection as understood in the art. In the illustrated embodiment, the application A10 ("HughesNet application") is preloaded in advance or installed on demand via an app store or marketplace.

The local network module 48 includes a wireless and/or wired network interface controller that connects the smart TV 40 to the communication terminal 24. In the illustrated embodiment, the local network module 48 can establish the local communication link LC relative to the local network module 38 of the communication terminal 24 wirelessly (e.g., Wi-Fi) or by wire (e.g., Ethernet). In the illustrated embodiment, the local network module 48 wirelessly connects to the communication terminal 24 directly or via the mesh node 42, for example.

The display 50 includes a flat panel display, such as a liquid crystal display, a light-emitting diode display, a plasma display, a quantum dot display, and the like. The display 50 displays images of the video contents that are played back by the application A10. The speaker 50 also outputs sound of the video contents that are played back by the application A10.

Figure 4:
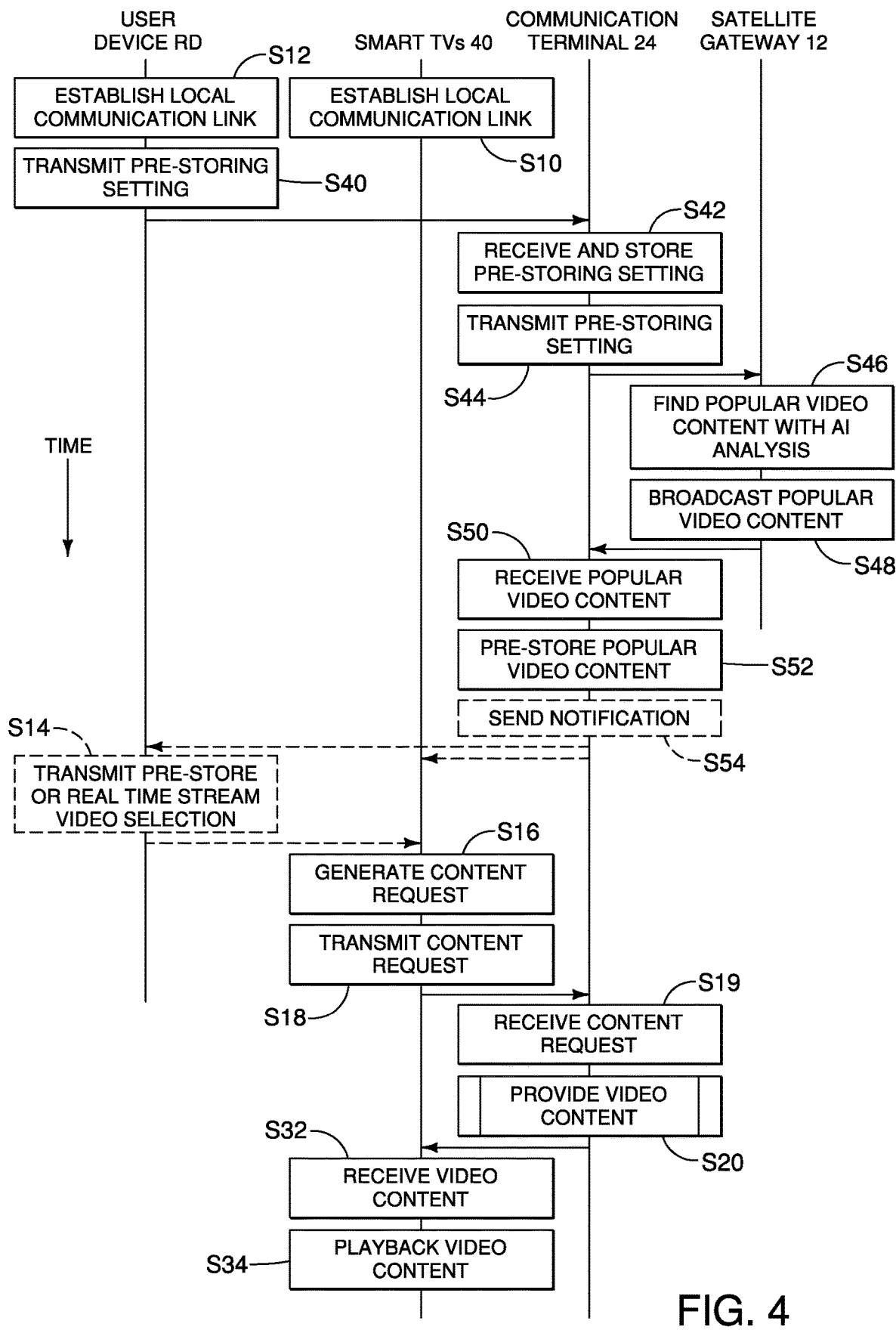
FIG. 4 illustrates a timing chart of overall processes of a satellite communication method performed by the satellite communication system.
Figure 5:
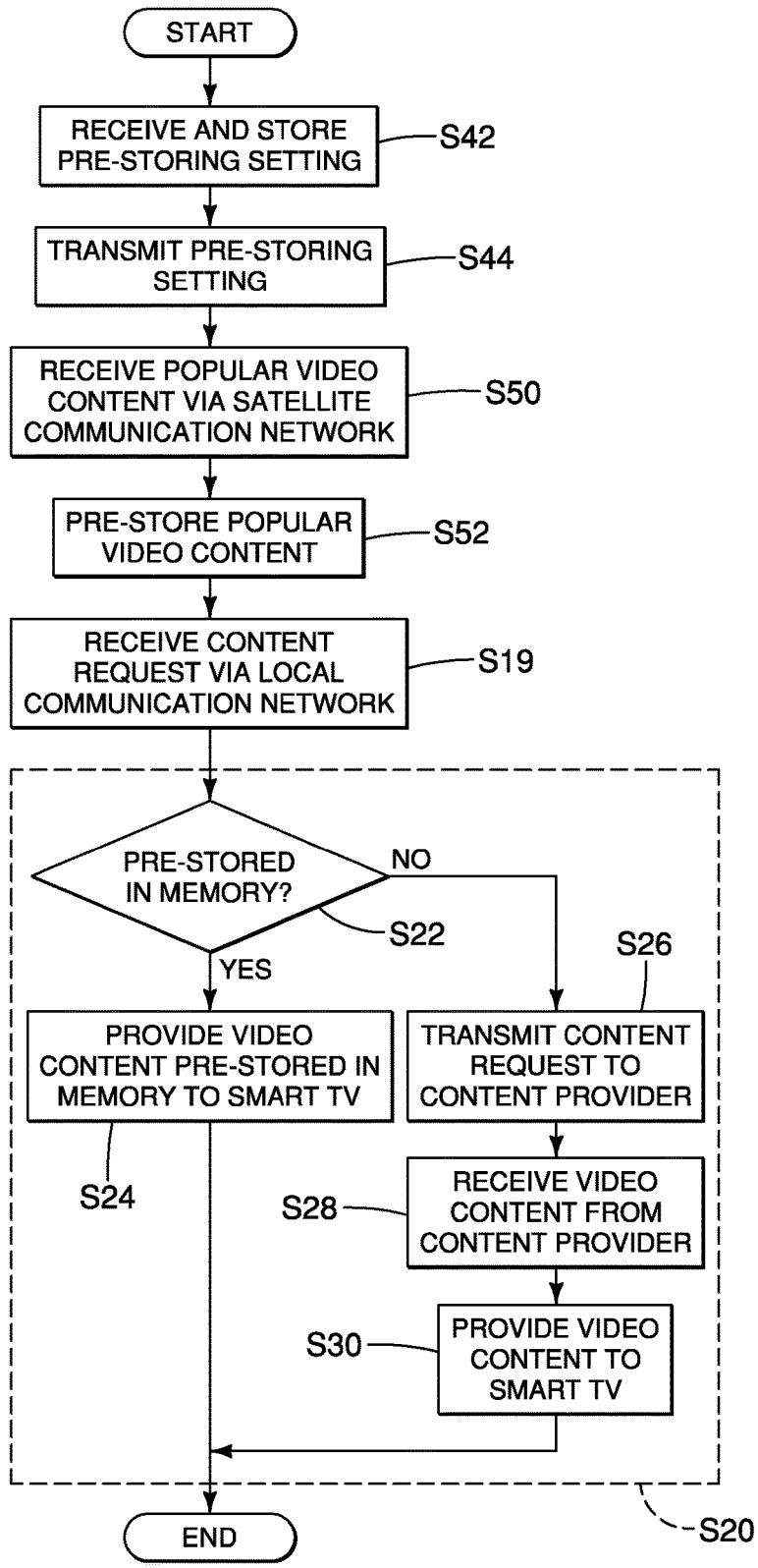
FIG. 5 illustrates a flowchart of processes for the satellite communication method shown in FIG. 4, illustrating operations of the satellite communication terminal of the satellite communication system.
Figure 6:
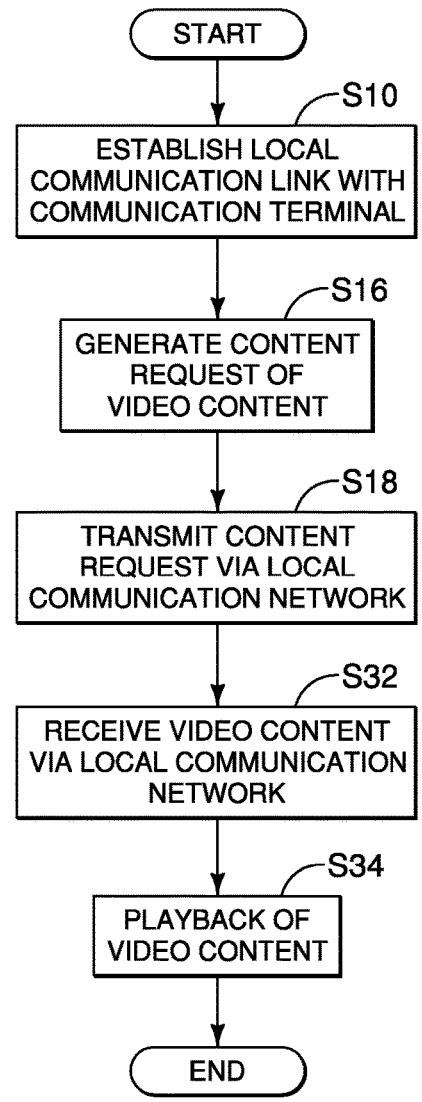
FIG. 6 illustrates a flowchart of processes for the satellite communication method shown in FIG. 4, illustrating operations of the smart TV of the satellite communication system.

Referring now to FIGS. 4-6, operations of the satellite communication system 10 for pre-storing the video contents on the communication terminal 24 and streaming the pre-stored video contents on the smart TVs 40 will be discussed. FIG. 4 illustrates a timing chart of overall processes for the operations performed by the satellite communication system 10, FIG. 5 illustrates a flowchart of processes for the operations performed by the communication terminal 24, and FIG. 6 illustrates a flowchart of processes for the operations performed by the smart TVs 40.

First, when the power of the smart TVs 40 is turned on, then the smart TVs 40 establish the local communication links LC to communicate with the communication terminal 24, respectively (step S10). Also, when the power of the user device RD is turned on, or the user device RD come within a predetermined range of the communication terminal 24, then the user device RD establishes the local communication links LC to communicate with the communication terminal 24 (step S12). Then, a user sets up pre-store or real time stream video selection (or a user input for requesting video content) on the communication terminal 24.

In the illustrated embodiment, the user can set up the pre-store or real time stream video selection using the user device RD. Specifically, in the illustrated embodiment, the user of the user device RD accesses a software application A12 (see FIG. 2) stored in a memory of the user device RD to set up the pre-store or real time stream video selection using a GUI or menu screen displayed on the user device RD. In the illustrated embodiment, the software application A12 can also support an audio control interface function using commercially available artificial intelligent (AI) tools (e.g., Google's Dialogflow). Thus, the user of the user device RD can also access the software application A12 to set up the pre-store or real time stream video selection using the audio control interface function. Alternatively or additionally, in the illustrated embodiment, the user can also set up the pre-store or real time stream video selection using other devices, such as remotes of the smart TVs 40. In this case, the user can access the software application A10 stored in the memory 46 of one of the smart TVs 40 using a remote of the one of the smart TVs 40 to set up the pre-store or real time stream video selection using a GUI or menu screen displayed on the display 50 of the one of the smart TVs 40.

Specifically, in the illustrated embodiment, when a user wants to watch video content, the user operates the user device RD or the remote of one of the smart TVs 40 to select the video content using a GUI or menu screen displayed on the user device RD using the software application A12 or the display 50 of the one of the smart TVs 40 using the software application A10, and send the pre-store or real time stream video selection of the video content to the one of the smart TVs 40. Specifically, the software applications A10 and A12 can provide a menu screen including a list of available or accessible video contents or channels by accessing the communication terminal 24 via the local communication network LN. This list of the available video contents can include not only pre-stored video contents that have been pre-stored in the memory 36 of the satellite communication terminal 24, but also video contents that can be streamed from the content provider 26 in real time. Generally, a smart TV by default can connect to an IP address of a satellite communication terminal directly, but cannot access a memory of the satellite communication terminal without settings of both the smart TV and the satellite communication terminal. On the other hand, with the application software A10 or A12, the smart TVs 40 or the user device RD can access the memory 36 of the satellite communication terminal 24 via the local communication network LN, and stream video contents via the internet stream process. Optionally, the user can also access the software application A12 of the user device RD to send the pre-store or real time stream video selection of the video content to the one of the smart TVs 40 via a wireless connection with the one of the smart TVs 40 (step S14).

In response to receiving the pre-store or real time stream video selection of the video content via the local communication network LN, the controller 44 of the one of the smart TVs 40 generates a content request (e.g., a first video content request) of the video content (step S16), and controls the local network module 48 to transmit the content request of the video content to the communication terminal 24 via the local communication network LN (step S18).

In response to receiving the content request of the video content via the local communication network LN (step S19), the communication terminal 24 provides the video content to the one of the smart TVs 40 via the local communication network LN (step S20).

Specifically, referring to FIG. 5, in response to receiving the content request of the video content via the local communication network LN, the controller 34 of the communication terminal 24 determines whether the video content that has been requested is pre-stored in the memory 36 of the communication terminal 24 (step S22). When the video content that has been requested is pre-stored in the memory 36 of the communication terminal 24 ("YES" in step S22), the controller 34 of the communication terminal 24 controls the local network module 38 to provide or stream the video content that has been pre-stored in the memory 36 to the one of the smart TVs 40 via the local communication network LN (step S24). Specifically, in this case, the local network module 38 of the communication terminal 24 provides the video content from the memory 36 to the one of the smart TVs 40 without accessing the satellite communication network SN in response to the content request of the video content via the local communication network LN. Also, in this case, with the communication terminal 24, the memory 36 pre-stores the video content prior to receiving the content request of the video content from the one of the smart TVs 40, and the local network module 38 provides the video content from the memory 36 in response to receiving the content request of the video content from the one of the smart TVs 40. As a result, the user can stream the video content that has been pre-stored in the memory 36 on the one of the smart TVs 40.

On the other hand, when the video content that has been requested is not pre-stored in the memory 36 of the communication terminal 24 ("NO" in step S22), the controller 34 of the communication terminal 24 controls the transceiver 32 to transmit the content request (e.g., a second video content request) of the video content to the content provider 26 through the satellite communication network SN and the Internet 28 (step S26). In response, the content provider 26 transmits the video content indicated by the content request back to the communication terminal 24 via the Internet 28 and the satellite communication network SN, and the transceiver 32 of the communication terminal 24 receives the video content (step S28). In response to receiving the video content, the controller 34 of the communication terminal 24 controls the local network module 38 to transmit the video content to the one of the smart TVs 40 through the local communication network LN (step S30). As a result, the user can stream the video content in real time on the one of the smart TVs 40.

As shown in FIG. 4, in response to the communication terminal 24 providing the video content to the one of the smart TVs 40 via the local communication network LN (step S20), the local network module 48 of the one of the smart TVs 40 receives the video content from the communication terminal 24 via the local communication network LN (step S32), and the controller 44 of the one of the smart TVs 40 plays back the received video content, and outputs video and sound of the received video content from the display 50 and the speaker 52 of the one of the smart TVs 40, respectively (step S34). In the illustrated embodiment, these processes are independently performed by the smart TVs 40 whose users request the video content. Also, the smart TVs 40 can independently and simultaneously receive the desired video content from the communication terminal 24 via the local communication network LN. In other words, the communication terminal 24 can independently and simultaneously multicast the desired video content to the smart TVs 40, respectively, in response to content requests from the smart TVs 40.

In the illustrated embodiment, as mentioned above, the communication terminals 24 can pre-store video contents that have been broadcasted by the gateway 12 via the satellite communication network SN. Specifically, in the illustrated embodiment, the gateway 12 can automatically find popular video contents using an artificial intelligent (AI) function and feedback from the communication terminals 24, and broadcast the popular video contents via the satellite communication network SN. Referring further to FIGS. 4-6, these processes will be described in detail.

As mentioned above, in the illustrated embodiment, the gateway 12 can receive content requests of video contents that are transmitted from the communication terminals 24 (step S26 in FIG. 5, for example). The controller 20 of the gateway 12 continuously stores the content requests in a database stored in the memory 22 of the gateway 12 to analyze the content requests using the AI function. Specifically, the controller 20 of the gateway 12 analyzes the content requests to determine a popularity condition related to video contents, for example.

In the illustrated embodiment, the term "popularity condition" generally refers to an indication of the popularity of specific video content, the popularity of series of video contents, the popularity of channels or genres of video contents, for example. For instance, the term "popularity condition" can refer to a number of content requests for specific video contents, for series of video contents, or for channels or genres of video contents. In the illustrated embodiment, the popularity condition is stored in the database stored in the memory 22 in association with each user, and is continuously and periodically updated.

Furthermore, in the illustrated embodiment, the user can set up a pre-storing setting (e.g., a user input or setting) for pre-storing video contents. Specifically, the user can access the software application A12 of the user device RD to set up the pre-storing setting. More specifically, in the illustrated embodiment, the user can access the software application A12 to select and set up specific video contents, series of video contents, channels or genres of video contents for pre-storing, for example. In response to this user input, the software application A12 sends the pre-storing setting indicative of specific video contents, series of video contents, channels or genres of video contents for pre-storing, for example, to the communication terminal 24 via the local communication network LN (step S40). Of course, alternatively or additionally, the user can also set up the pre-storing setting by accessing the software application A10 using a remote of one of the smart TVs 40, and the software application A10 can send the pre-storing setting to the communication terminal 24 via the local communication network LN.

In response to receiving the pre-storing setting via the local communication network LN, the controller 34 of the communication terminal 24 stores the pre-storing setting in the memory 36 (step S42). In the illustrated embodiment, the controller 34 of the communication terminal 24 can also control the transceiver 32 to transmit the pre-storing setting with user information of the communication terminal 24 to the gateway 12 via the satellite communication network SN (step S44). These processes are independently performed by each of the communication terminals 24.

In response, the gateway 12 receives the pre-storing setting via the satellite communication network SN. The controller 20 of the gateway 12 continuously stores the pre-storing setting in the database stored in the memory 22 to analyze the pre-storing setting using the AI function. Specifically, the controller 20 of the gateway 12 analyzes the pre-storing setting to determine or update the popularity condition of video contents, for example.

As mentioned above, in the illustrated embodiment, the gateway 12 can be managed by the AI function to analyze the content requests from the communication terminals 24, as well as broadcast popular video contents that have been chosen based on the popularity condition to users of the communication terminals 24 who have chosen or set up the same or similar video contents for pre-storing to avoid repetitive data transmissions to multiple users.

Specifically, in the illustrated embodiment, the controller 20 of the gateway automatically finds popular video contents with the AI analysis (step S46). In particular, the controller 20 of the gateway 12 automatically finds popular video contents based on the popularity condition from among available video contents that is available from the content provider 26 via the Internet 28. More specifically, the controller 20 of the gateway 12 automatically searches available video contents that meet with the popularity condition as the popular video contents. For example, in the illustrated embodiment, the controller 20 of the gateway 12 searches, based on the popularity condition, available video contents which have been requested more than a predetermined number of times, whose series have been requested more than a predetermined number of times, or whose channels or genres have been requested more than a predetermined number of times, and determines the available video contents as the popular video contents. In the illustrated embodiment, in addition to this AI analysis, the controller 20 of the gateway 12 can also find the popular video contents based on feedbacks of video contents from the communication terminals 24.

Then, the gateway 12 broadcasts the popular video contents to the communication terminals 24 via the satellite communication network SN (step S48). In the illustrated embodiment, the gateway 12 broadcasts the popular video contents using a conditional access system (CAS), which allows the users of the communication terminals 24 who have chosen or set up the same or similar video contents for pre-storing to receive and pre-store the popular video contents.

In particular, in the illustrated embodiment, in response to finding the popular video contents, the controller 20 of the gateway 12 obtains the popular video contents from the content provider 26 via the Internet 28, and stores the popular video contents in the memory 22. The controller 20 also analyzes the user information included in the pre-storing setting, scrambles or encrypts the popular video contents by using the user information or a master key associated with the user information, and controls the transceiver 18 to transmit or broadcast the encrypted video contents via the satellite communication network SN when a prescheduled delivery time of the video contents has reached. Thus, in the illustrated embodiment, the gateway 12 can wait until there are many users who have chosen or set up the same or similar video contents for pre-storing for improving overall satellite efficiency by broadcasting the same video content to as many users as possible at the same time.

The transceiver 32 of the communication terminal 24 receives the encrypted video contents from the gateway 12 via the satellite communication network SN (step S50). In other words, the transceiver 32 receives the encrypted video contents from the gateway 12 via the satellite communication network SN in response or after transmitting the pre-storing setting to the gateway 12 via the satellite communication network SN. When the communication terminal 24 receives the encrypted video contents via the satellite communication network SN, the controller 34 of the communication terminal 24 decrypts the encrypted video contents with the user information or the master key, and pre-stores the video contents in the memory 36 of the communication terminal 24 (step S52). These processes are also independently performed by each of the communication terminals 24 whose users set up the pre-store or real time stream video selection of the same or similar video contents. Thus, the transceivers 32 of the communication terminals 24 can simultaneously receive the video contents from the gateway 12 via the satellite communication network SN. Also, the memories 36 of the communication terminals 24 can pre-store the same video contents that have been simultaneously received from the gateway 12 via the satellite communication network SN.

In the illustrated embodiment, the memory 36 of the communication terminal 24 sequentially records (pre-stores) video contents that have been broadcasted from the gateway 12. Since the memory space of the memory 36 is limited, the controller 34 of the communication terminal 24 manages the memory space of the memory 36 periodically or when needed. Specifically, to prevent the memory 36 from becoming full of the pre-stored video contents, the controller 34 of the communication terminal 24 determines video contents to be deleted using machine learning function analysis to open up the memory space for newly pre-stored video contents. Specifically, in the illustrated embodiment, the controller 34 of the communication terminal 24 analyzes the pre-storing setting stored in the memory 36 using machine learning function analysis, for example, to determine the user's current interests or preferences of video contents. For example, the controller 34 gives priority to the pre-storing setting, such as specific video contents, specific series of video contents, channels and genres of video contents, using the machine learning function analysis. Then, the controller 34 of the communication terminal 24 automatically deletes video contents having lower priorities from the memory 36 such that the memory 36 only keeps video contents in which the user currently has interests (e.g., video contents having higher priorities). The controller 34 of the communication terminal 24 can update periodically (e.g., every day) or when needed (e.g., when the memory 36 becomes full).

Optionally, when video content is newly pre-stored in the memory 36 of the communication terminal 24, the controller 34 of the communication terminal 24 can notify the user that new video content has been pre-stored in the communication terminal 24 (step S54). Specifically, the controller 34 of the communication terminal 24 can control the local network module 38 to send the notification to the user device RD or the smart TVs 40 via the local communication network LN.

In the illustrated embodiment, the gateway 12 can simultaneously broadcast the same video content to the communication terminals 24. Thus, along with improving normal internet access speed and satellite-based stream video quality, the satellite data traffic and the customer data usage can be reduced by avoiding repeatedly and independently sending the same video content to each of the communication terminals 24, and thus overall satellite efficiency and satellite service quality can also be improved.

Furthermore, in the illustrated embodiment, the communication terminals 24 can obtain the video content that has been broadcasted by the gateway 12 via the satellite communication network SN, and pre-store the video content in the memories 36 of the communication terminals 24. Generally, satellite-based internet providers do not directly support smart TV stream video application, and have difficulty in supporting 4K TV stream videos due to the high-speed requirement for the 4K TV steam videos. However, in the illustrated embodiment, even if the bandwidth of the satellite communication network SN are not large enough for streaming the high-quality video contents in real time, the high-quality video contents can be downloaded in advance via the satellite communication network SN by scheduling the broadcast of the high-quality video contents from the gateway 12 on a time period in which the satellite data traffic is not busy or by downloading the high-quality video contents in background, for example. Thus, in the illustrated embodiment, the users of the satellite-based communication terminals 24 can enjoy the high-quality video contents having 4K or higher resolution, which are originally provided by the content provider 26 via the Internet 28 and the satellite communication network SN.

Also, in the illustrated embodiment, the software application A10 that runs on the smart TVs 40 can support video contents having 4K or higher resolution, and stream the video contents having 4K or higher resolution that have been pre-stored in the communication terminal 24. Thus, the stream video quality played by multiple smart TVs 40 can be improved up to 4K or higher resolution.

Also, in the illustrated embodiment, the communication terminal 24 can directly support multiple smart TVs 40 without using an externally connected streaming video receiver for each smart TV 40. Specifically, the video contents can be pre-stored in the communication terminal 24 and played on the multiple smart TVs 40 without the need for other dedicated streaming video receivers, such as Amazon Fire TV, Roku, Android boxes, and the like. In particular, in the illustrated embodiment, the video contents can be sent to the multiple smart TVs 40 directly from the communication terminal 24. Thus, the communication terminal 24 can be used to stream to the multiple smart TVs 40 without using dedicated streaming video receivers that are plugged into the smart TVs 40. Generally, when users want to watch streaming video contents on multiple smart TVs, then the users need to have a dedicated streaming receiver for each smart TV. Also, such dedicated streaming receivers typically do not support pre-storing of video contents that have received via the satellite communication network. On the other hand, in the illustrated embodiment, users can save money from not having to purchase separate streaming receivers. Also, in the illustrated embodiment, users can directly enjoy pre-stored video contents that have received via the satellite communication network SN on the multiple smart TVs 40.

GENERAL INTERPRETATION OF TERMS

In understanding the scope of the present invention, the term "comprising" and its derivatives, as used herein, are intended to be open ended terms that specify the presence of the stated features, elements, components, groups, and/or steps, but do not exclude the presence of other unstated features, elements, components, groups, integers and/or steps. The foregoing also applies to words having similar meanings such as the terms, "including", "having" and their derivatives. Also, the terms "part," "section," or "element" when used in the singular can have the dual meaning of a single part or a plurality of parts.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A satellite communication system comprising:
    a satellite gateway including a first satellite communication module; and
    a plurality of satellite communication terminals disposed at a plurality of remote locations, the plurality of satellite communication terminals each including
        a local communication module configured to receive a user pre-storing setting via a local communication network, the user pre-storing setting being for a series, channel or genre that a user has set up in advance for future storage to indicate user content preference,
        a memory configured to store the user pre-storing setting,
        an electronic controller configured to use the user pre-storing setting to manage memory space of the memory, and
        a second satellite communication module configured to communicate with the first satellite communication module of the satellite gateway to transmit the user pre-storing setting with user information of the satellite communication terminal to the satellite gateway via the satellite communication network;
    the satellite gateway configured to
        receive the user pre-storing setting and respective user information from the plurality of satellite communication terminals via the satellite communication network,
        update a popularity condition based on the user pre-storing setting received from the plurality of satellite communication terminals, and
        transmit video content data automatically to the plurality of satellite communication terminals via the satellite communication network based on the respective user information and the popularity condition indicating the pre-storing setting for the series, channel or genre being requested more than a predetermined number of times by multiple users; and
    the satellite communication terminals each further configured such that
        the second satellite communication module receives the video content data from the satellite gateway via the satellite communication network,
        the memory pre-stores the video content data prior to a first video content request of the video content data via a local communication network,
        the electronic controller analyzes the user pre-storing setting when the video content data is received by the second satellite communication module to prioritize video content already stored in the memory, and causes lowest priority video content to be deleted from the memory to open up memory space of the memory for the video content data received by the second satellite communication module to be pre-stored in the memory, and
        the local communication module provides the video content data from the memory in response to the first video content request of the video content data via the local communication network.

2. The satellite communication system according to claim 1, wherein
    the local communication module is configured to provide the video content data from the memory without accessing the satellite communication network in response to the first video content request of the video content data via the local communication network.

3. The satellite communication system according to claim 1, wherein
    the second satellite communication module of each of the satellite communication terminals is configured to simultaneously receive the video content data from the satellite gateway via the satellite communication network, and
    the memory of each of the satellite communication terminals is configured to pre-store the video content data that has been simultaneously received from the satellite gateway via the satellite communication network.

4. The satellite communication system according to claim 1, wherein
    the satellite gateway determines that the video content data has at least 4K resolution and that the bandwidth of the satellite communication network is not large enough to stream 4K resolution in real time, and schedules transmission of the video content data to the plurality of satellite communication terminals for a later time period.

5. The satellite communication system according to claim 1, wherein
    the electronic controller of each satellite communication terminal is programmed to determine whether the video content data is pre-stored in the memory in response to the first video content request of the video content data via the local communication network, and
    the second satellite communication module of each satellite communication terminal is configured to transmit a second video content request of the video content data to the satellite gateway via the satellite communication network when the video content data is not pre-stored in the memory.

6. The satellite communication system according to claim 5, wherein
    the second satellite communication module of each satellite communication terminal is configured to receive the video content data from the satellite gateway via the satellite communication network in response to the second video content request of the video content data via the satellite communication network, and the local communication module is configured to provide the video content data in response to the video content data being received from the satellite gateway via the satellite communication network in response to the second video content request of the video content data via the satellite communication network.

7. The satellite communication system according to claim 1, further comprising
at least one display device disposed at a respective one of the remote locations for each of the satellite communication terminals, the at least one display device each including
an electronic controller that is programmed to generate the first video content request of the video content data in response to a user input,
a local communication module that is configured to transmit the first video content request of the video content data to a respective one of the satellite communication terminals via the local communication network, and receive the video content data from the respective one of the satellite communication terminals via the local communication network in response to the first video content request of the video content data, and
a display panel that is configured to display the video content data.

8. The satellite communication system according to claim 7, wherein
the at least one display device includes a plurality of display devices for each of the satellite communication terminals, and
each of the satellite communication terminals is configured to establish local communication links to independently communicate with the display devices, respectively.

9. The satellite communication system according to claim 8, wherein
the display devices are configured to independently and simultaneously receive the video content data from the respective one of the satellite communication terminals via the local communication links, respectively.

10. The satellite communication system according to claim 9, wherein
the local communication links are established using Ethernet or Wi-Fi.

11. A satellite communication method comprising:
receiving, by a satellite communication terminal via a local communication network, a user pre-storing setting, the user pre-storing setting being for a series, channel or genre that a user has set up in advance for future storage to indicate user content preference;
storing the user pre-storing setting in a memory of the satellite communication terminal disposed at a remote location;
transmitting, from the satellite communication terminal to a satellite gateway via a satellite communication network, the user pre-storing setting with user information of the satellite communication terminal;
receiving, by the satellite gateway via the satellite communication network, the user pre-storing setting and respective user information from a plurality of satellite communication terminals disposed at remote locations;

updating, by the satellite gateway, a popularity condition based on the user pre-storing setting received from the plurality of satellite communication terminals;
automatically transmitting, by the satellite gateway, video content data via the satellite communication network to the satellite communication terminal disposed at the remote location based on the respective user information and the popularity condition indicating the pre-storing setting for the series, channel or genre being requested more than a predetermined number of times by multiple users;
pre-storing the video content data in the memory of the satellite communication terminal disposed at the remote location prior to a first video content request of the video content data via the local communication network;
analyzing, by an electronic controller of the satellite communication terminal, the pre-storing setting when the video content data is received by the satellite communication terminal to prioritize video content already stored in the memory;
causing, by the electronic controller of the satellite communication terminal, lowest priority video content to be deleted from the memory to open up memory space of the memory for the video content data when the video content data is received by the satellite communication terminal to be pre-stored in the memory; and
providing the video content data from the memory in response to the first video content request of the video content data via the local communication network.

12. The satellite communication method according to claim 11, wherein
the providing of the video content data from the memory includes providing the video content data from the memory without accessing the satellite communication network in response to the first video content request of the video content data via the local communication network.

13. The satellite communication method according to claim 11, comprising
simultaneously receiving the video content data via the satellite communication network by a plurality of satellite communication terminals, and
pre-storing the video content data that has been simultaneously received via the satellite communication network in the memory of each of the satellite communication terminals.

14. The satellite communication method according to claim 11, comprising
determining at the satellite gateway that the video content data has at least 4K resolution,
determining at the satellite gateway that the bandwidth of the satellite communication network is not large enough to stream 4K resolution in real time, and
scheduling transmission of the video content data to the plurality of satellite communication terminals for a later time period.

15. The satellite communication method according to claim 11, further comprising
determining that the video content data is not pre-stored in the memory of the satellite communication terminal by the electronic controller of the satellite communication terminal in response to the first video content request of the video content data via the local communication network, and in response, transmitting a second video content request of the video content data via the satellite communication network.

16. The satellite communication method according to claim 15, comprising
- receiving the video content data that has been transmitted via the satellite communication network in response to the second video content request of the video content data via the satellite communication network, and
- providing the video content data in response to receiving the video content data that has been transmitted via the satellite communication network in response to the second video content request of the video content data via the satellite communication network.

17. The satellite communication method according to claim 11, further comprising
- generating the first video content request of the video content data by at least one display device disposed at the remote location for the satellite communication terminal;
- transmitting the first video content request of the video content data to the satellite communication terminal via the local communication network;
- receiving the video content data by the at least one display device from the satellite communication terminal via the local communication network in response to the first video content request of the video content data; and
- displaying the video content data using the at least one display device.

18. The satellite communication method according to claim 17, wherein
- the at least one display device includes a plurality of display devices for the satellite communication terminal, and
- the satellite communication method further comprises establishing local communication links by the satellite communication terminal to independently communicate with the display devices, respectively.

19. The satellite communication method according to claim 18, wherein
- the receiving of the video content data from the satellite communication terminal via the local communication network includes independently and simultaneously receiving the video content data from the satellite communication terminal via the local communication links, respectively.

20. The satellite communication method according to claim 19, wherein
- the local communication links are established using Ethernet or Wi-Fi.

* * * * *